Patented Sept. 29, 1953

2,653,970

UNITED STATES PATENT OFFICE 2,653,970

OLEFIN SULFITATION PROCESS

William A. Fessler, Prince George County, Va., assignor to Allied Chemical & Dye Corporation, New York, N. Y., a corporation of New York No Drawing. Application January 12, 1950, Serial No. 138,267

6 Claims. (Cl. 260—513)

This invention relates to addition of water-soluble bisulfite to olefin of relatively high molecular weight; more especially, an olefin containing from about 10 to about 22 carbon atoms in the molecule; and still more particularly, an olefin containing between about 12 and about 18 carbon atoms in the molecule.

One object of my invention is to obtain sulfonic acid salts in good yield from olefins containing 10-22 carbon atoms in the molecule. Another object is to obtain compounds having good surface-active and/or detergent properties and other valuable properties in economical manner from olefins. Other objects and advantages will appear hereinafter.

It is known that water-soluble bisulfite salts will add in liquid reaction media to the double bond of a low molecular weight olefin to form sulfonic acid salts and that this reaction is catalyzed by oxidizing agents. However, so far as I am aware, no method has heretofore been known for obtaining practical yields of a sulfonic acid salt by addition of bisulfite to relatively high molecular weight olefin. Moreover, in accordance with prior art processes, it has been considered desirable to use as catalyst relatively expensive oxidizing agents, such as peroxides, rather than air or other gas containing molecular oxygen. Hence, prior art processes for bisulfite addition to olefins appear impractical for commercial preparation of alkyl sulfonate detergents.

I have now discovered conditions for reaction of bisulfite in aqueous solution with an individual olefin or mixed olefin fraction in about the $C_{10}$—$C_{22}$ range, using air or other gas containing molecular oxygen as catalyst, which conditions produce high yields of sulfonates and minimize waste of bisulfite by oxidation thereof. Broadly, these conditions involve maintaining in the aqueous bisulfite solution a pH above 6 and below about 9, thereby assuring the presence in the reaction mixture of sulfite ions as well as bisulfite ions; finely dispersing in the reaction phase a gas containing molecular oxygen; and using olefin at least a portion of which has a terminal double bond. Preferably, the olefin fraction boils within the range corresponding to olefins containing between 12 and 18 carbon atoms, inclusive, in the molecule. When pH is referred to herein, it is to be understood this means pH as measured with a glass electrode at 30° C.

In a preferred embodiment of my process wherein the yields of sulfonate obtained in given time under the above stated conditions are greatly increased and the ratio of (sulfur added to olefin):(sulfur oxidized) is increased, a polar organic solvent, especially a monohydric saturated alcohol containing 3-5 carbon atoms, is added to the reaction medium.

Addition of a water-soluble surface-active agent to the reaction medium is a further feature of preferred embodiments of my process which often improves very materially the yield of product obtainable in given time in accordance with my process and increases the ratio of (sulfur added to olefin):(sulfur oxidized).

Yields by my process are practically quantitative on reacted olefin; and the olefin which is unreacted remains reactive with nitrosyl halides. Accordingly, after bisulfite has been added by my process to a portion of the olefin present in a reaction mixture, unreacted olefin may be separated from the aqueous layer containing dissolved sulfitation product and may be further reacted, e. g. with nitrosyl chloride or bromide and then with an alkali metal sulfite to form a further quantity of sulfonate surface-active agent. The final yield of sulfonate surface-active agent, based on starting olefins, obtained by this variant of my process approaches the theoretical.

The following examples illustrate my invention, but the invention is not to be understood as limited thereby.

In the examples, the operations were carried out in flasks equipped with stainless steel propeller type stirrer, thermometer, inlet for oxygen-containing gas, and reflux condenser. The sulfonate product was recovered by adjusting the pH of the aqueous layer containing dissolved sulfonate product to pH of 9, separating the aqueous layer, extracting the aqueous layer with ether to remove any unreacted oil therein, and evaporating the aqueous solution of organic sulfonate and inorganic salts to dryness on a steam bath. Yield of organic sulfonate was determined by analysis of the recovered solids for carbon content. The products have good detergent properties in soft and hard water, and have exceptionally low color, low hygroscopicity, and good alkaline and acid stability.

*Example 1.*—About 0.2 mol of an olefin fraction of boiling range corresponding to olefins of mainly 14-22 carbon atoms, obtained by cracking a waxy petroleum fraction, was charged to the reaction vessel, along with an aqueous solution containing 0.3 mol of sodium bisulfite, 0.5 mol of sodium sulfite, and 15 mols of water. 50 grams of detergent from a previous run (which contains about 40% active ingredient) and 44.5 grams (i. e. about 0.6 mol) of tertiary butyl alcohol were then added to the charge. The temperature was maintained at about 30° C. and about 0.05 mol of cylinder oxygen per hour was bubbled through the reaction mixture which was vigorously stirred. The original reaction mixture consisted of 3 liquid phases and 1 solid phase; during reaction this changed to 2 liquid phases and 1 solid phase.

Reaction was continued for 40 hours. The sulfonate product formed was then separated and determined as described above. The yield of sulfonate product based on starting olefin was 88.8% of theory. The mol ratio of (sulfur added to olefin):(sulfur oxidized) was about 0.3:1. A test for sodium sulfite in the product showed sodium sulfite was absent.

*Example 2.*—About 0.2 mol of a fraction (mainly $C_{12}$—$C_{18}$) of the olefin cut of Example 1 was reacted as in Example 1 in a reaction medium containing 0.3 mol of sodium bisulfite, 0.5 mol of sodium sulfite, 10 mols of water, and 0.6 mol of isopropanol at a temperature of 75° C., employing 0.2 mol of air per hour as catalyst, for 16 hours. The phase behavior of the system was similar to that of Example 1. The mol percent yield of sulfonate detergent was 79.6% based on starting olefin.

In a larger scale run under the conditions of this example, 2 mols of the above olefin cut were heated for 46 hours with sodium bisulfite, in presence of 25 grams of detergent from a previous run. The mol percent yield of sulfonate product was 84.4%.

Unreacted olefins from the 2 mol run were contacted with nitrosyl chloride and then heated with aqueous sodium bisulfite-sodium sulfite-isopropanol. An 83.1 mol percent yield of sulfonate detergent based on the unreacted olefins as starting material was obtained. The overall conversion of olefins to detergent by the combined process was 96.7% of theory.

*Example 3.*—0.2 mol of the olefin fraction employed in Example 1, was sulfitated in presence of 50 grams of detergent from a previous run and a total of 15 mols of water under conditions essentially the same as in Example 2, except that 0.6 mol of ethyl alcohol was used instead of the propanol of Example 2. In the initial reaction mixture 2 liquid phases were present and one solid phase, and during reaction the solid phase disappeared. The yield of sulfitated olefin obtained was 30.8 percent of theory based on the starting olefins. In the absence of added detergent, but under conditions otherwise essentially the same, the yield of sulfitated olefin was only about 3 percent of theory based on the starting olefins.

*Example 4.*—Sulfitation of the olefin fraction of Example 1 was carried out essentially under the conditions of Example 3 but employing, instead of ethyl alcohol, 45 grams (i. e. about 0.6 mol) of by-product alcohols, mostly isobutyl alcohol, from reaction of carbon monoxide and hydrogen in a methanol synthesis plant. The sulfitation reaction mixture at the start of the reaction formed 3 liquid phases and one solid phase, and at the end of the reaction formed a single liquid phase and no solid phase. The yield of sulfitated olefin was 66.8% of theory based on the starting olefins.

In the above examples, pH of the aqueous phase is maintained between about 6.5 and 7.5 by addition to the reaction mixtures of sodium sulfite. Other alkaline materials may similarly be used to establish pH within the desired range.

With the aqueous phase maintained at pH 6.5–7.5 or more broadly, in the pH range above 6 and below about 9, sulfite ions and bisulfite ions will both be present in the reaction mixture. As long as considerable amounts of sulfite ions are present as well as bisulfite ions, oxidation of sulfur results chiefly in formation of sulfate ions, since bisulfate ions formed will react with sulfite ions, forming sulfate and bisulfite ions. Accordingly bisulfite ion concentration is decreased essentially only by addition of bisulfite to olefin. The sodium sulfate produced by oxidation is a desirable constituent of the finished detergent, since it functions as a builder for the detergent. The quantity of sodium sulfite employed may be chosen to give the desired amount of builder in the finished detergent. A suitable quantity of sodium sulfate builder is about 60% by weight of the detergent composition.

For reasons of economics, I prefer to use sodium bisulfite in my process, but other water-soluble bisulfites, for example ammonium bisulfite or aliphatic amine or pyridine bisulfite may be used.

At least a portion of the olefins employed in the above examples contain terminal double bonds. The presence of some terminal double bond olefins in my starting material appears necessary for good yields on starting olefins by my process, but terminal double bonds are not necessarily the only constituents of my starting materials which react with bisulfite. For example, after addition of terminal double bond olefin to an unreactive olefinic starting material obtained by cracking, which additive functioned (apparently by forming detergent) to overcome inhibitors, at least about 40 mol percent of the cracking olefins, as well as the added terminal double bond olefin, reacted with bisulfite under my process conditions.

I may use individual terminal double bond olefins in my process, such as dodecene-1, tetradecene-1, hexadecene-1 and octadecene-1. I have found, however, that terminal double bond olefinic starting materials containing a mixture of olefins of boiling ranges including ranges for olefins having between about 10 and about 22 carbon atoms, and preferably boiling within the ranges for olefins having between 12 and 18 carbon atoms, inclusive, are superior to individual olefins for my purpose, because the sulfonates obtained therefrom are more resistant to lime.

Some olefin fractions contain high boiling materials which act as inhibitors in my process; accordingly such olefin fractions should be cut at a boiling point not excessively far above the $C_{22}$ range. On standing, certain olefin fractions deposit a sediment which appears to be an inhibitor in my process; it is desirable that such olefins be freed of sediment, e. g. by decantation, filtration or redistillation shortly before use.

Olefinic starting materials suitable for use in my process may be obtained by cracking aliphatic higher waxy petroleum fractions such as petrolatum, and distilling the product into one or more cuts of boiling ranges corresponding approximately to $C_{10}$—$C_{22}$ olefin. Olefin cuts from other sources are also suitable; for example, olefins obtained by Fischer-Tropsch synthesis give very satisfactory yields in my process. The olefin cuts may contain other substances, e. g. saturated hydrocarbons, as well as olefins.

As catalyst in my process, I employ molecular oxygen which may be in the form of air or in purified form. Use of a purified form of oxygen requires passing a smaller volume of gas through the reaction mixture and therefore leads to smaller volatilization of organic solvent when such solvent is present; but yields in given time are substantially the same using a given volume of purified oxygen or using air containing the same volume of oxygen.

The oxygen-containing gas must be finely dispersed in the liquid phase in which reaction takes place. A state of fine dispersion may be obtained by bubbling the gas in small bubbles into the reaction phase while vigorously stirring the reaction phase, and may be assisted by presence of a detergent in the reaction phase. Yields obtained in given time increase as the speed of stirring is increased from low values upward, and approach limiting value as higher stirring speeds are employed.

My process is operative using only water as reaction medium, giving improved results over those of prior art processes; but addition to the reaction medium of a polar organic solvent, particularly a water-soluble volatile alcohol containing at least 3 carbon atoms (i. e. a propanol, a butanol, or a pentanol) greatly increases the yields obtained in given time and the ratio of (sulfur added to olefin):(sulfur oxidized). Polar solvents which have been used successfully in addition to the above-noted alcohols include acetone; dioxane; methyl, ethyl and butyl monoethers of ethylene glycol; propionaldehyde; mixed by-product alcohols, preponderantly isobutyl alcohol, from a methanol synthesis plant; ethyl alcohol and methyl alcohol. The solvent should preferably be non-reactive under the process conditions employed.

With most of the above reaction media addition of water-soluble surface-active agent to the reaction medium very materially increases the yield of sulfonate obtained in given time; however, a water-isopropanol reaction medium gives satisfactory ratios for sulfur utilization and very excellent yields in a reasonable time without such additive.

Quantities of water, bisulfite, and alkaline material employed in my process may be varied within ranges which preserve the above specified pH, above 6 and below about 9, in the aqueous bisulfite solution. Bisulfite may be introduced in amounts equivalent to the olefin to be reacted or in excess, and an amount of alkali sulfite or other alkaline material is added which establishes the desired pH. Preferably sodium bisulfite is used, in amounts of about 1–3 mols per mol of olefin starting material, and sodium sulfite is added in a ratio of about 1.5–3 mols per mol of bisulfite, establishing a pH between about 6.5 and about 7.5. The amount of water employed is preferably about 25–75 mols per mol of olefin starting material.

When a polar organic liquid is added to the reaction medium, it may suitably be employed in amounts of 1 to 8 mols, preferably about 4–6 mols per 100 mols of water present. Water-soluble surface-active agent may be added in any desired amounts, but best results are usually obtained with 40 to 200 grams, preferably about 100 grams of active ingredient per mol of starting olefin (i. e. 100 to 500, preferably about 250 grams of the usual detergent containing about 40% active ingredient). The surface-active agent may be from a previous run or may be of different character, e. g. an alkylaryl sulfonate or alcohol sulfate detergent.

Ordinarily, my preferred reaction mixtures containing e. g. a propanol or a butanol form, at the start of the reaction, 3 liquid phases (water rich, alcohol rich, and olefin rich) and one solid phase. The oxygen-containing gas employed as catalyst appears chiefly in the gas phase. I believe that in the above systems of 3 liquid phases, the reaction takes place chiefly in the alcohol rich phase, since this phase contains dissolved therein appreciable amounts of both bisulfite and olefin. Particularly with surface-active agent present, however, it is not essential for occurrence of reaction that the constituents of the reaction system be present in proportions to form 3 liquid phases. The reaction proceeds satisfactorily in systems of 2 or even one liquid phase in presence of surface-active agent added initially or formed during the reaction.

Temperatures in my process may suitably be from about room temperature to the reflux temperature of the reaction mixture. Reaction rate and yield do not appear very sensitive to temperature at least within this temperature range. Pressures may suitably be about atmospheric or may be superatmospheric if desired. Use of superatmospheric pressure reduces, in inverse proportion to pressure, the quantity of volatile solvent carried out of the reactor with a given weight of exit gas.

Corrosion resistant materials should be used for construction or lining of the reaction vessel for my process. Stainless steel, vitreous or resinous materials and the like are suitable for the purpose.

I claim:

1. A process for addition of sodium bisulfite to an open chain olefin in about $C_{10}$—$C_{22}$ range containing at least a portion of terminal double bond olefin, which comprises forming a reaction mixture containing olefin as aforesaid, water, a water-soluble volatile alcohol containing at least 3 carbon atoms, sodium bisulfite, sodium sulfite, and water-soluble surface active material formed by addition of sodium bisulfite to said olefin, in which reaction mixture the pH in the aqueous phase is between about 6.5 and about 7.5 as measured with a glass electrode at 30° C.; sodium bisulfite is introduced in $NaHSO_3$ mol ratios between about 1:1 and about 3:1 with the olefin introduced and sodium sulfite is introduced in $Na_2SO_3$ mol ratios between about 1.5:1 and about 3:1 with sodium bisulfite introduced; finely dispersing a gas containing molecular oxygen through said reaction mixture; maintaining temperatures between about room temperature and the reflux temperature of the reaction mixture; and maintaining pH in the aqueous phase above 6 and below about 9 as measured with a glass electrode at 30° C.

2. Process as defined in claim 1, wherein the gas containing molecular oxygen is air under superatmospheric pressures and wherein the reaction mixture is vigorously stirred.

3. Process as defined in claim 2 wherein unreacted olefins are separated from olefin-sodium bisulfite addition products; said unreacted olefins are contacted with nitrosyl chloride and then heated in an aqueous sodium bisulfite-sodium sulfite-isopropanol reaction mixture; and sulfonates thus formed are recovered.

4. Process as defined in claim 1, wherein the alcohol is isopropanol.

5. Process as defined in claim 1, wherein at least initially the reaction system contains 3 liquid phases and 1 solid phase.

6. Process as defined in claim 1, wherein the olefin starting material is a mixture of olefins boiling within the range corresponding to olefins having between 12 and about 18 carbon atoms, inclusive, in the molecule; the reaction mixture is vigorously stirred; and the surface active material is maintained present throughout the reaction period in amounts at least about 40 grams of active ingredient per mol of olefin introduced.

WILLIAM A. FESSLER.

References Cited in the file of this patent

UNITED STATES PATENTS

| Number | Name | Date |
|---|---|---|
| 2,318,036 | Werntz | May 4, 1943 |
| 2,398,426 | Hanford | Apr. 16, 1946 |
| 2,443,716 | Beckham | June 22, 1948 |
| 2,504,411 | Harman | Apr. 18, 1950 |
| 2,510,282 | Gold | June 6, 1950 |

OTHER REFERENCES

Kharasch: J. Org. Chem., vol. 3 (1938), pp. 175–192.

Mayo: Chem. Reviews, vol. 27 (1940), pp. 394–399.